United States Patent [19]

Wing

[11] Patent Number: 4,796,343

[45] Date of Patent: Jan. 10, 1989

[54] GAS TURBINE ENGINE ROTOR ASSEMBLY

[75] Inventor: Rodney G. Wing, Middlesex, England

[73] Assignee: Rolls-Royce plc, London, England

[21] Appl. No.: 76,832

[22] Filed: Jul. 23, 1987

[30] Foreign Application Priority Data

Aug. 1, 1986 [GB] United Kingdom ............... 8618786

[51] Int. Cl.[4] .............................................. B23P 15/02
[52] U.S. Cl. ............................ 29/156.8 R; 416/213 R
[58] Field of Search .................... 29/156.8 R; 416/213;
228/175, 186, 193

[56] References Cited

U.S. PATENT DOCUMENTS 3,904,101  9/1975  Beltran et al. .................. 228/193 X

FOREIGN PATENT DOCUMENTS 1586331  3/1981  United Kingdom .
2106425  4/1983  United Kingdom .......... 29/156.8 R
2106016  4/1983  United Kingdom .......... 29/156.8 R
2109274  6/1983  United Kingdom .......... 29/156.8 R

*Primary Examiner*—Mark Rosenbaum
*Assistant Examiner*—Frances Chin
*Attorney, Agent, or Firm*—Parkhurst, Oliff & Berridge

[57] ABSTRACT

A circumferential array of aerofoil blades (11) comprising an aerofoil portion and a root portion is mounted on the periphery of a disc (14), sealed in place under vacuum and subsequently hot isostatically pressed to achieve diffusion bonding across the interface between the array (11) and the disc (14). Each of the root portion of the array (11) and the disc (14) is provided with axially extending flanges (12, 13, 15 and 16) at its axial ends. The flanges (12, 13, 15 and 16) are so dimensioned that when the array (11) is mounted on the disc (14) the flanges (12, 13, 15 and 16) engage each other in close fitting relationships in such a way that the array (11) and the disc (14) have an enclosed annular chamber radially spacing them apart. Annular chambers (18, 19) are provided at the interfaces of the confronting flanges (12, 13, 15 and 16), and the regions of the interfaces between the chambers (18) and the free axial ends of the flanges (12, 13, 15 and 16) are sealed by vacuum brazing. The outermost chambers (18) prevent the braze material from penetrating the interface between the array (11) and the disc (14), and from penetrating the second annular chambers (19). During hot isostatic pressing an enclosed annular chamber (20) collapses and diffusion bonding occurs between the array (11) and the disc (14) as well as between the flanges (12, 13, 15 and 16). The second annular chambers (19) are designed to collapse to provide a visual indication of the success of the pressing step.

11 Claims, 3 Drawing Sheets

GAS TURBINE ENGINE ROTOR ASSEMBLY

BACKGROUND OF THE INVENTION

This invention relates to a gas turbine engine rotor assembly and in particular to a method of manufacturing a gas turbine engine rotor assembly.

Rotor assemblies which are intended for use in gas turbine engines usually comprise a disc having an annular array of aerofoil blades equally spaced apart around its radially outer periphery. The aerofoil blades are usually attached to the disc by some form of mechanical connection. Thus for instance it is common to provide each aerofoil blade with a fir-tree configuration root which locates in a correspondingly shaped cut-out portion in the disc periphery. While such methods of attachment are satisfactory when employed in medium to large size gas turbine engines, they are not so successful when employed in small gas turbine engines.

Because of the physical limitations in manufacturing small scale components, rotor blade aerofoil cross sections are disproportionately large in comparison with the rotor disc to which they are required to be fixed. They therefore in turn require relatively large fir-tree type root fringes to adequately retain them on the disc at high rotational speeds.

As speeds and temperature are increased in order to meet the demands of impaired performance, then the proportions of fir-tree type fixings need to be increased still further. Thus a mechanical limitation is reached with overcrowding of the blade root fixings on the rotor disc periphery. It is therefore desirable to provide an alternative method of attaching rotor blades to discs in which the use of mechanical root fixings is eliminated, thereby alleviating the problem of overcrowding on the disc periphery.

In UK Patent No. 1586331 there is described a method of manufacturing a rotor assembly in which the disc is formed with a plane periphery and the aerofoil blades constitute part of a ring which is adapted to fit onto that periphery. The joint lines between the ring and the disc are brazed under vacuum after which the assembly is hot isostatically pressed to achieve diffusion bonding across the interface between the ring and disc. Thus the method avoids the overcrowding and consequent mechanical limitation of conventional root fixing on a small diameter disc since there is no mechanical connection between the aerofoil blades and the disc.

One advantage of producing rotor assemblies by this method is that of achieving satisfactory location of the ring on the disc. Thus since it is difficult to achieve abutting surfaces of the ring and disc which match exactly, there is a possibility that some areas will abut while others will be spaced apart by varying distances. This in turn can lead to problems in achieving satisfactory sealing of the joint lines between the ring and disc and also variability in the quality of the diffusion bond across the interface between the ring and disc.

British Patent Application Nos. 2106425A and 2106016A disclose gas turbine rotors which are made by diffusion bonding preformed aerofoil blades to the periphery of a disc by using a hot isostatic pressure technique. Initially the interface between the blades and the periphery of the disc is sealed by a brazing step. To prevent the braze material from contaminating the interface between the blades and the disc, a braze trap in the form of a small chamber is provided. Experience shows that this chamber becomes filled with braze material during the brazing step.

SUMMARY OF THE INVENTION

It is an object of the present invention to provide a method of manufacturing a rotor assembly for a gas turbine engine by the diffusion bonding of blades to a disc wherein improved location of the blades on the disc prior to diffusion bonding is achieved.

According to the present invention, a method of manufacturing a rotor assembly for a gas turbine engine comprises the steps of fabricating a metal disc having at least one axially extending annular flange at its radially outer periphery, fabricating a circumferential array of spaced aerofoil shaped metal blades each comprising an aerofoil portion and a root portion which has an axially extending flange of complementary shape to at least part of the circumference of the annular flange of the disc, mounting the array of blades on the radially outer periphery of the disc with the flange or flanges of the array of blades confronting the annular flange of the disc, the flanges of the array of blades and the disc being provided with circumferential grooves that cooperate to define at least two spaced circumferentially extending enclosed chambers at the interface between the flanges, sealing the joint interface at a location between a first chamber and the free end of the flanges, and subsequently hot isostatically pressing the resultant assembly thereby to achieve diffusion bonding between the array of blades and the disc and between the flanges of the array of blades and the disc and to collapse the second chamber thereby to provide a visual indication of the extent and success of the diffusion bonding.

BRIEF DESCRIPTION OF THE DRAWINGS

The invention will now be described by way of example with reference to the accompanying drawings in which.

DESCRIPTION OF THE PREFERRED EMBODIMENTS

Figure 1:
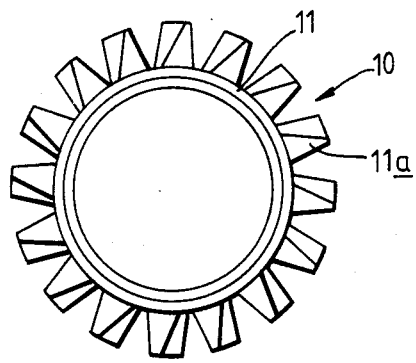
FIG. 1 is a side view of a ring provided with an array of radially extending aerofoil blades.

With reference to FIG. 1, a bladed ring generally indicated at 10 comprises a ring 11 which is provided with an annular array of equally spaced apart radially extending aerofoil blades 11a mounted around its radially outer periphery. The bladed ring 10 may be fabricated by any convenient method. Thus, for instance, it may be fabricated by assembling an annular array of aerofoil blades having platforms so that the platforms of adjacent blades abut and then bonding the abutting blades together by, for instance, electron beam welding. Alternatively, it may be fabricated by forming a ring having a plurality of aerofoil cross-section slots in its periphery, inserting aerofoil blades of corresponding cross-sectional shape in the slots and subsequently fixing the blades in the slots by electron beam welding. It will be appreciated, however, that other methods of fabricating the bladed ring could be employed if desired.

Figure 4:
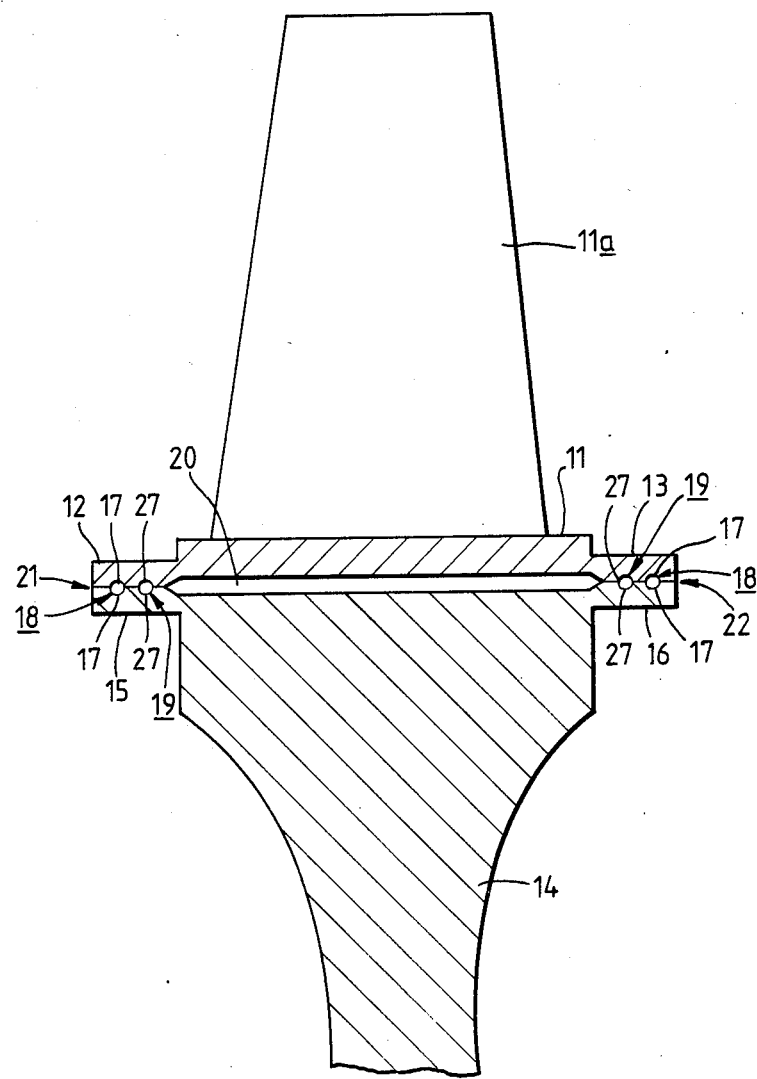
FIG. 4 is a cross-sectional view of a portion of the bladed ring/disc assembly shown in FIG. 3.

The ring 11 is provided with two axially extending flanges 12 and 13 as can be seen in FIG. 4 which are positioned on each of its axial ends so as to be in axially spaced apart relationship. After fabrication of the bladed ring 10, the radially inner periphery of the flanges 12 and 13 are machined to the same internal diameter. The radially inner periphery of the ring 11 is, however machined to an internal diameter which is slightly greater than that of the flanges 12 and 13. The bladed ring 10 may be fabricated from any convenient alloy, but it is preferably fabricated from a nickel base alloy and, in particular, the nickel base alloy known as MARM002.

Figure 2:
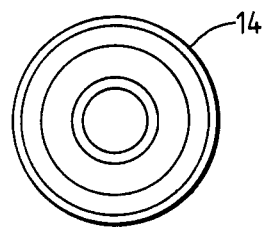
FIG. 2 is a side view of a disc.

The disc 14 shown in FIG. 2 is preformed from particles of an alloy which have been compacted under suitable conditions of temperature and pressure so as to consolidate them. The alloy is also a nickel base alloy and is preferably that which is known as "Astroly". The disc 14 is so configured as to be provided with two axially extending flanges 15 and 16 which are positioned on each axial end of the disc so as to be in axially spaced apart relationship, the axial spacing being the same as that which separates the flanges 12 and 13 on the ring 11. The disc 14 is so formed that the radially outer periphery of each flange 15 and 16 is slightly greater than the inside diameter of each of the flanges 12 and 13. The flanges 15 and 16 are, however, machined after consolidation until they each have an outside diameter which is equal to the inside diameter of each of the flanges 12 and 13. The radially outer periphery of the disc 14 is also machined after consolidation, but it is so machined that its outside diameter is slightly less than that of flanges 15 and 16.

All of the flanges 12, 13, 15 and 16 are additionally machined so that each is provided with two spaced circumferential grooves 17, 27. More specifically, the grooves 17, 27 on the flanges 12 and 13 are on their radially inner peripheries and the grooves 17, 27 on the flanges 15 and 16 are on their radially outer peripheries. The grooves 17, 27 in the flanges 12 and 13 are axially spaced apart by the same distance as that by which the grooves 17, 27 in the flanges 15 and 16 are axially spaced apart.

Figure 3:
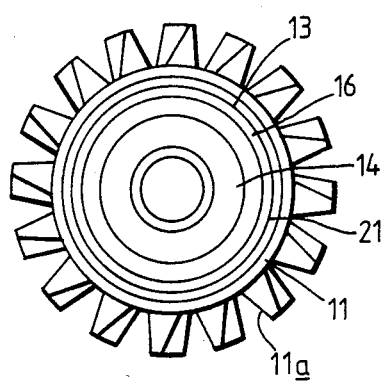
FIG. 3 is a side view of the bladed ring shown in FIG. 1 mounted on the disc shown in FIG. 2.

The bladed ring 10 is then heated up until it thermally expands to such an extent that it may be mounted on the radially outer periphery of the disc 14 in the manner shown in FIGS. 3 and 4. The blade ring 10 is so mounted on the disc 14 that the grooves 17, 27 in the flanges 12 and 15 and those in the flanges 13 and 16 cooperate to define the enclosed chambers 18 and 19 respectively. Moreover since the radially inner periphery of the ring 11 and the radially outer periphery of the disc 14 have diameters different from those of the flanges 12, 13, 15 and 16, then they, together with the flanges 12, 13, 15 and 16, cooperate to define a further enclosed chamber or gap 20. The whole assembly of the bladed ring 10 and the disc 14 is then allowed to cool so that the ring 11 contracts onto the disc 14, thereby providing a close fit between the flanges 12, 13, 15 and 16. Thus since the disc 14 and the ring 11 are spaced apart by the annular enclosed chamber 20 the flanges 12, 13, 15 and 16 provide the only means of location of the bladed ring 10 on the disc 14.

The flanges 12 and 15 together define an exposed annular joint line 21 and the flanges 13 and 16 likewise define an exposed annular joint line 22. These annular joint lines 21 and 22 are sealed by vacuum brazing so that the interfaces between the flanges 12, 13, 15 and 16 that are located at the free axial ends of the flanges 12, 13, 15 and 16 outwards of the chambers 18 are sealed. The annular enclosed chambers 18, which may for instance be up to 2.5 mm diameter, act as braze traps so as to prevent the flow of molten braze into the interfaces between the flanges 12, 13, 15 and 16 as well as into the annular chambers 19 and the chamber 20.

It will be appreciated that other high melting point sealants could be employed to seal the joint lines 21 and 22. Alternatively, sealing may be achieved by means such as electron beam welding or other welding techniques.

After the joint lines 21 and 22 have been sealed under vacuum the whole assembly is subjected to hot isostatic pressing. Thus the assembly is subjected to pressure of 28,000 pounds per square inch at a temperature of 1228° C. for four hours. This serves to achieve diffusion bonding between the flanges 12, 13, 15 and 16. Moreover, it causes the second chambers 19, and the chamber 20 to collapse so that a continuous diffusion bond is created between the ring 11, the disc 14 and the flanges 12, 13, 15 and 16. The chambers 19 are dimensioned (typically 2.5 mm diameter) so as to collapse during the hot isostatic pressing step. Collapsing of the chambers 19 forms shallow troughs in the surfaces of the flanges and these provide a reliable visual indication of successful diffusion bonding. The chambers 18 cannot be relied upon to provide this indication because they become filled with the sealant or braze and they ensure that the chambers 19 do not receive braze or sealant.

If the interface between the flanges becomes contaminated or inclusions are present then diffusion bonding will not occur properly and the chambers 19 will not collapse fully and this will be evident by looking at the surfaces of the flanges. It will be seen therefore that prior to the hot isostatic pressing step, the flanges 12, 13, 15 and 16 provide the sole means of location of the bladed ring 10 on the disc 14. Accurate location of the bladed ring 10 on the disc 14 is thereby ensured.

After hot isostatic pressing has been discontinued, the resultant rotor assembly is inspected by ultrasonic examination. Now the diffusion bond between the ring 11 and the disc 14 is so positioned that it cannot be satisfactorily inspected ultrasonically. This is because effective ultrasonic examination requires the ultrasonic probe to be positioned generally normal to the surface to be inspected, and the configuration of the disc 14 and the location of the aerofoil blades 11a effectively preclude this. However, the flanges 12, 13, 15 and 16 are so configured that the diffusion bonds between them can be readily inspected ultrasonically. Thus it has been found that if the diffusion bonds between the flanges 12 and 15 and 13 and 16 are satisfactory, then so too is the diffusion bond between the ring 11 and the disc 14. This is especially so in the case of the enclosed chambers 19, since if the hot isostatic pressing is sufficient to collapse them and if sealant or braze is not allowed to enter them, then the enclosed chamber 20 will also have collapsed and diffusion bonding will have occurred between the ring 11 and the disc 14. If a satisfactory degree of diffusion bonding is detected, the flanges 12, 13, 15 and 16 are removed by machining them off. If it is desired to make further visual inspection of the interface between the flanges 12 and 15 and 13 and 16, the machining operation could be carried out in such a way as to reveal sectional views of the interface. In any case the extent of the collapsing of chambers 19 will provide a good reliable visual indication because the surfaces of the flanges remote from the joint line will have annular depressions.

Figure 5:
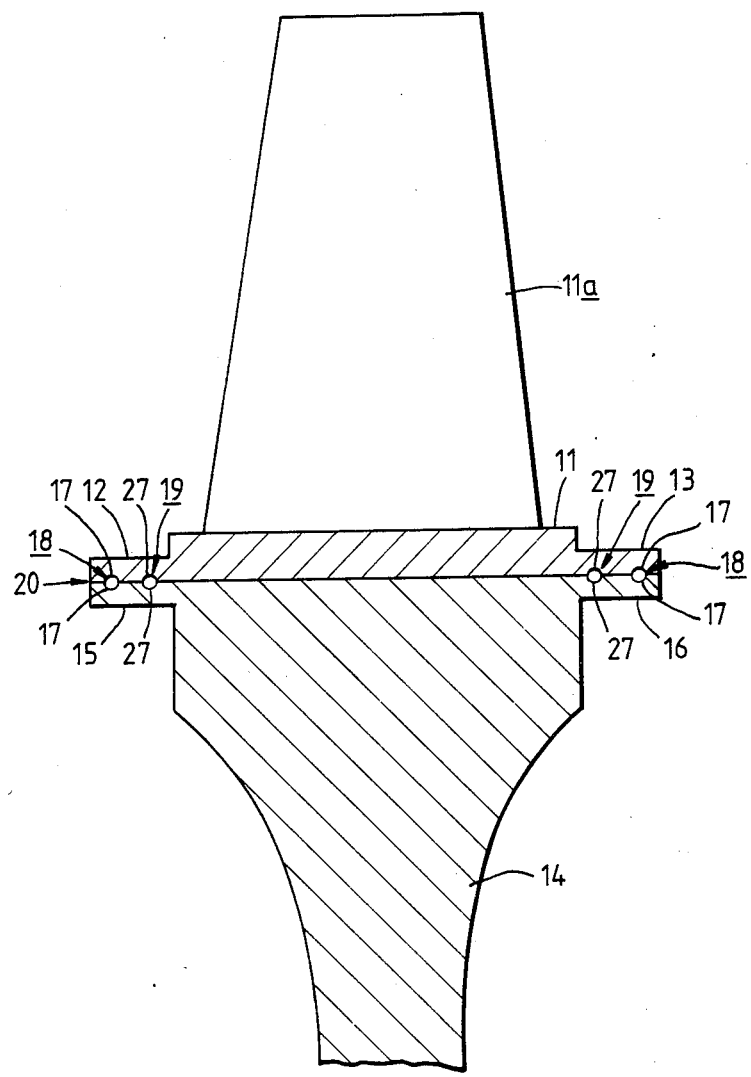
FIG. 5 is a cross-sectional view of a portion of a second embodiment of the invention, showing the arrangement of the axially extending flanges thereon.

Referring to FIG. 5, similar parts to those in FIG. 4 have been given the same reference numerals.

The only significant difference between the embodiment of FIG. 5 and that of FIG. 4 is that in the FIG. 5 embodiment no chamber equivalent to chamber 20 is provided between the ring 11 and the disc 14.

In the two specific embodiments described above the blades are first assembled to form a ring 11 and ring 11, is subsequently diffusion bonded to the disc 14. This is the preferred way of fabricating the rotor. However it may also be possible to assemble an array of components, each of which comprises an aerofoil portion and a root portion which in cross section is of a similar shape to the cross section of the rings 11 shown in FIGS. 4 and 5, and diffusion bond these to the periphery of the disc 14. In this case each root portion has one or more flanges (equivalent to the flanges 12, 13, but these flanges are segments of an annulus. When assembled on the disc, the flanges cooperate to define an annular flange complementary to and confronting the flanges on the disc. It is thought that this latter mentioned way of fabricating the rotor may not be as good as fabricating a ring first because of the difficulties of achieving good diffusion bonds between adjacent root portions. It may be necessary to form each root portion as segments of a ring so that during the pressing step they consolidate to form an integral bladed disc.

In order to ensure that ultrasonic surface effects are avoided, it is usually necessary to ensure that the flange thicknesses are appropriate for the type of ultrasonic equipment which is to be used. Thus the flanges 12, 13, 15 and 16 each preferably have a thickness greater than 0.3 inches.

I claim:

1. A method of manufacturing a rotor assembly for a gas turbine engine comprising the steps of:

fabricating a metal disc having at least one axially extending annular flange at is radially outer periphery;

fabricating a circumferential array of spaced aerofoil shaped metal blades, each blade comprising an aerofoil portion and a root portion which has at least one axially extending flange shaped complementary to at least part of the circumference of the at least one annular flange of the disc;

mounting the array of blades on the radially outer periphery of the disc with the at least one flange of each blade confronting the at least one annular flange of the disc, the at least one flange of each blade and the at least one annular flange of the disc each being provided with at least two spaced circumferential grooves that cooperate to define at least two spaced circumferentially extending enclosed chambers at an interface between the at least one flange of each blade and the at least one annular flange of the disc;

sealing the interface between each at least one blade flange and the at least one annular disc flange at a location between a first of said chambers and free axial ends of each at least one blade flange and the at least one annular disc flange; and subsequently hot isostatically pressing the resultant assembly thereby to achieve diffusion bonding between the array of blades and the disc and between the at least one flange of each blade and the at least one annular flange of the disc, and to collapse a second of said chambers thereby to provide a visual indication of success of the diffusion bonding.

2. A method according to claim 1, wherein the array of blades comprises a plurality of blades having a common root portion, and the at least one axially extending flange of each blade is a portion of a unitary annular flange.

3. A method according to claim 1, wherein the array of blades comprises a plurality of blades each with its own discrete root portion, each root portion having at least one axially extending flange which is a segment of an annulus, and the step of mounting the array of blades on the disc comprises the steps of assembling the plurality of blades around the disc with each at least one blade flange segment cooperating to form at least one additional annular flange which confronts the at least one annular flange of the disc.

4. A method according to claim 1, wherein the step of mounting the array of blades on the disc comprises the step of engaging the array of blades in contact with the periphery of the disc over substantially the entire length of a boundary therebetween.

5. A method according to claim 1, wherein the step of mounting the array of blades on the disc comprises the step of forming a gap between the array of blades and the disc over substantially the entire length of a boundary therebetween, except at the location of the interface between the first chamber and the free axial ends of each at least one blade flange and the at least one annular disc flange.

6. A method according to claim 1, wherein each blade and the disc are each provided with a pair of axially oppositely extending flanges.

7. A method according to claim 1, wherein the at least one flange of each blade and the at least one annular flange of the disc are machined off after the hot isostatic pressing step.

8. A method according to claim 1, wherein the location of the interface between the first chamber and the free axial ends of each at least one blade flange and the at least one annular disc flange is sealed with a brazing alloy.

9. A rotor assembly for a gas turbine engine manufactured in accordance with the method claimed in claim 1.

10. A method of manufacturing a rotor assembly for a gas turbine engine comprising the steps of:

fabricating a metal disc having at least one axially extending annular flange at its radially outer periphery;

fabricating a circumferential array of spaced aerofoil shaped metal blades, each blade comprising an aerofoil portion and a root portion which has at least one axially extending flange shaped complementary to at least part of the circumference of the at least one annular flange of the disc;

mounting the array of blades on the radially outer periphery of the disc with the at least one flange of each blade confronting the at least one annular flange of the disc, the root portion of each blade and the disc each being provided with at least two spaced grooves that cooperate to define at least two spaced enclosed chambers at an interface between the disc and the root portion of each blade;

sealing the interface between the disc and the root portion of each blade at a location adjacent a first of said chambers; and subsequently hot isostatically pressing the resultant assembly thereby to achieve diffusion bonding between the array of blades and the disc and between the at least one flange of each blade and the at least one annular flange of the disc, and to collapse a second of said chambers thereby to provide a visual indication of success of the diffusion bonding.

11. A method of manufacturing a rotor assembly for a gas turbine engine comprising the steps of:

fabricating a member of circular cross-section;

fabricating an array of aerofoil shaped blades, each blade comprising an aerofoil portion and a root portion;

mounting each said blade on a radially outer peripheral portion of said member, the root portion of each said blade confronting said member, each said root portion and said member being provided with at least one pair of grooves that cooperate to define first and second enclosed chambers at an interface between said member and each said root portion;

sealing the interface between each said root portion and said member at a location between the first chamber and a peripheral edge of each said root portion; and subsequently hot isostatically pressing the resultant assembly thereby to achieve diffusion bonding between each said blade and said member, and to collapse the second chamber thereby to provide a visual indication of success of the diffusion bonding.

* * * * *

UNITED STATES PATENT AND TRADEMARK OFFICE
CERTIFICATE OF CORRECTION

PATENT NO. : 4,796,343

DATED : January 10, 1989

INVENTOR(S) : R. G. WING

It is certified that error appears in the above-identified patent and that said Letters Patent is hereby corrected as shown below:

Column 1, line 29, change "impaired performance" to -- improved performance --.

Signed and Sealed this

Eighteenth Day of June, 1991

Attest:

HARRY F. MANBECK, JR.

*Attesting Officer*   *Commissioner of Patents and Trademarks*